Nov. 2, 1943.  C. L. BRACKETT  2,333,290
NUT AND METHOD OF MAKING SAME
Filed Feb. 23, 1943  2 Sheets-Sheet 1
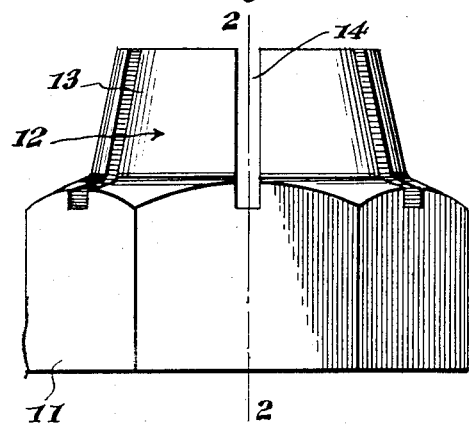
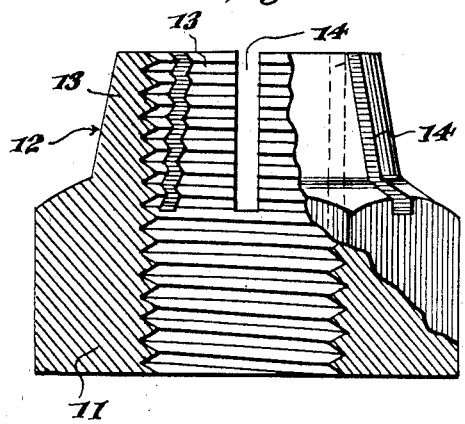
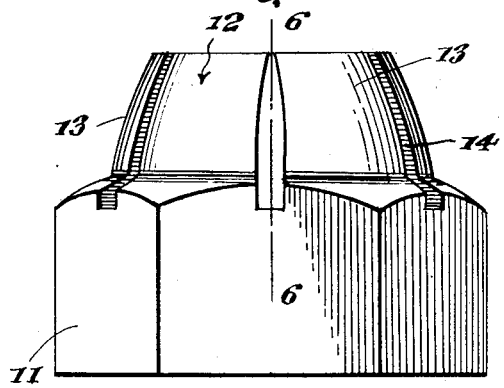
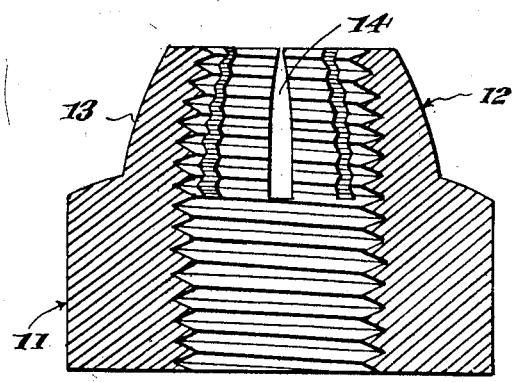
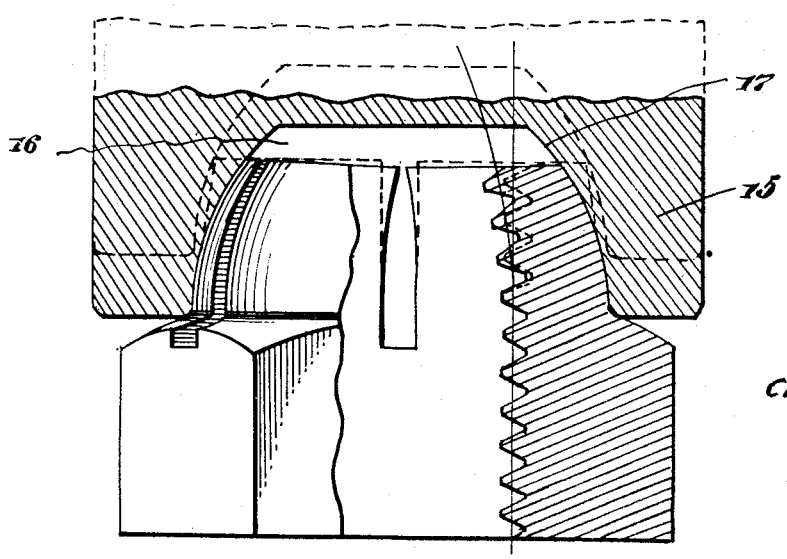
INVENTOR
CLARE L. BRACKETT Nov. 2, 1943.　　　　C. L. BRACKETT　　　　2,333,290
NUT AND METHOD OF MAKING SAME
Filed Feb. 23, 1943　　　　2 Sheets-Sheet 2
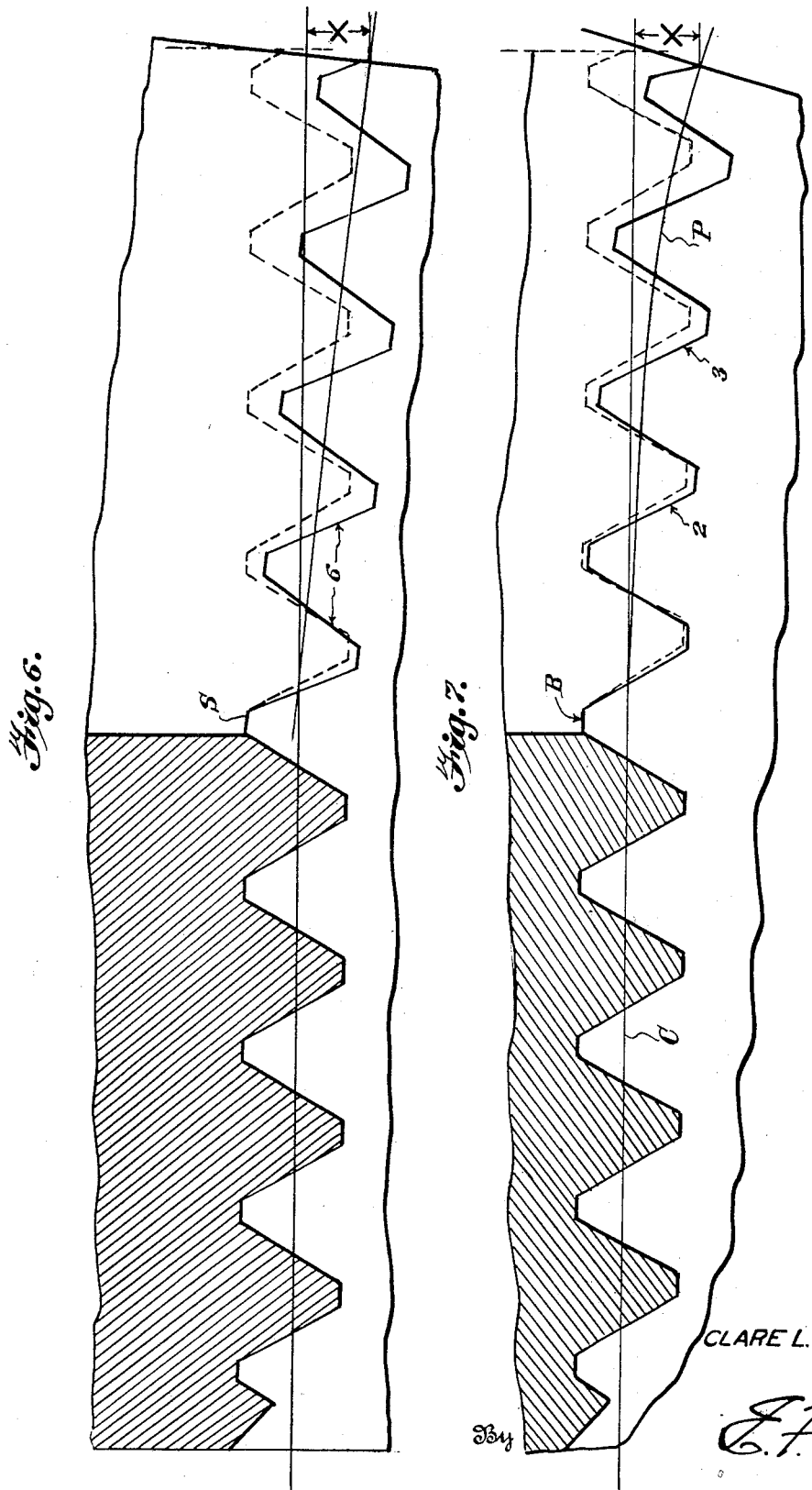
Inventor
CLARE L. BRACKETT
By E. F. Salter
Attorney Patented Nov. 2, 1943

2,333,290

UNITED STATES PATENT OFFICE 2,333,290

NUT AND METHOD OF MAKING SAME

Clare L. Brackett, Detroit, Mich.

Application February 23, 1943, Serial No. 476,804

12 Claims. (Cl. 10—86)

This invention relates to the art of screw-threaded fastening elements and more particularly to nuts and a method of making the same.

Many efforts, too numerous to mention specifically, have been made in the past to provide a threaded element or nut of such a character that when tightened or screwed home upon an object to be retained, the movable element or nut will not tend to loosen or otherwise relinquish the desired holding effect.

It has been proposed to provide a nut having a portion of its threads tapped in cylindrical form and the remainder of its threads uniformly tapered, the idea being that the tapered or constricted threads will produce a binding or frictional resistance between the nut and the screw with the result that the nut will be held securely in the desired or selected position. In some cases of this kind a portion of the nut may be slotted longitudinally so as to relieve a part of the pressure upon the screw, maintaining meanwhile, however, a sufficient pressure or tension in the slotted portion.

It has also been proposed to provide a nut with longitudinal slots in a portion thereof and cylindrically tapping the entire nut, the material between the slots being distorted radially inward so as to constrict the bore of the nut in the slotted portion.

Objections have been found to nuts fashioned in the manner suggested above. When a tapered thread is forced outwardly by the screw or a substantially cylindrical thread is compressed radially inward thereby assuming taper form, a localized zone of strain is created in the nut adjacent the point of change in the direction of the pitch line and a sudden or sharp change in the pitch of the thread is also involved. These conditions may produce a first or subsequent fracture of the nut in the region of this zone or a destruction of the threads so as to render the nut useless. Another objection to the types of nut above specified is that the frictional resistance between the threads of the nut and the screw may in many cases become so great due in part to the imperfect matching of the threads as to wholly destroy the true thread characteristics of either the nut or screw or both so as to render the nut useless for first or subsequent use.

The present invention seeks to obviate the above objections and is directed to the end of producing a nut or screw-threaded fastening element of such a character that it is in itself self-locking or self-sustaining without the presence of any localized zone of strain or detrimental friction between the nut and screw when in use. To this end, the nut or fastening element is provided with a base or body portion and a crown portion in the form of a plurality of segments separated from each other by intervening slots or openings. After the nut is bored, it is tapped cylindrically and the segments of the crown portion are then bent radially inward and preferably to an equal degree. The inward bending or constriction of the segments is such that no sudden congestion in the pitch occurs but such changes as may occur in the pitch are slow or gradual with a maximum deviation adjacent the exposed end of the crown segments where they are more resilient. The inward bending of the segments of the crown is such that the pitch line of the threads takes the form of a curve instead of a straight line as in the case of a cylindrical or tapered thread. By this construction a self-locking nut is provided in which injurious friction and localized zone of strain are avoided and one which may be used an unlimited number of times without danger of fracture or reduction in its efficiency as a self-locking member.

Other objects will be readily apparent to those skilled in the art.

While the present disclosure constitutes an embodiment of the best means I have thus far devised for reducing the invention to practice, it is to be understood that the structural details may be varied as desired and may be substituted by substantial equivalents within the scope of the invention as claimed. It will also be understood that the invention is equally applicable to many types and dimensions of threads.

In the accompanying drawings, wherein like characters of reference designate like parts throughout the several views—

Figure 1 is a side view of a nut made in accordance with the invention prior to distortion or bending of the segments of the crown.

Figure 2 is a section, partly in elevation of the nut structure of Figure 1.

Figure 3 is a side view illustrating the radial inward bending or constriction of the crown segments.

Figure 4 is a sectional view illustrating the inward bending or constriction of the threads along a curved and diminishing pitch line.

Figure 5 is a sectional view partly in elevation showing the application of the forming tool for producing the inward bending or constriction of the crown segments and the positioning of the threads of the nut along a curved and diminishing pitch line.

Figure 6 is a view generally illustrating the prior art practice referred to wherein the abrupt or sudden change in the pitch and pitch line of a cylindrical thread when utilized in conjunction with a tapered thread or when portions of a cylindrical thread are distorted or constricted radially inward to provide increased friction or resistance when turned upon the screw. In the construction here illustrated a localized zone of strain is created adjacent the point of change in the pitch line.

Figure 7 is a diagrammatic view of the instant invention illustrating the slow and gradual inward constriction or distortion of the threads in the crown portion of the nut in such a manner that abrupt or sudden changes in the pitch of the threads are avoided and a curved pitch line is maintained in a progressive and accelerated degree toward the exposed end of the crown portion.

A nut made in accordance with my invention comprises a body 11 and crown 12. The crown is in the form of the frustum of a cone and consists of a plurality of arcuate segments 13 separated from one another by the slots 14. The outer side walls of the crown segments are tapered to an extent sufficient to provide for the proper inward constriction or displacement of the threads to produce the results hereinafter described.

Following the formation of the bore of the nut, it is then cylindrically or otherwise tapped as illustrated in Figure 2. Thereafter the threaded crown segments or portions thereof are distorted or moved radially inward in the manner and to an extent to provide a constriction of the threads along a curved and diminishing pitch line, so that the constriction of the threads beginning adjacent the cylindrical threads starts from that position and continues in a gradual and accelerated degree with the result that the threaded bore of the nut is substantially less in diameter at the exposed end of the crown than at the opposite end thereof. Under these conditions no sudden or abrupt change in the pitch of the threads occurs.

Figure 6 may be considered as showing diagrammatically the known practice of providing a self-locking nut where a portion of the threads are cylindrically tapped and another portion of the threads are taper tapped, see full line threads. When a nut so fashioned is applied to a screw, the entering or leading edge of the tapered threads are displaced to such an appreciable extent that an abrupt change occurs in the faces of the threads and excessive friction and strain is at once set up between the nut and the screw. This character of thread displacement creates a localized zone of strain indicated at 8 at the base of the crown which renders it liable to fracture in its first or subsequent use.

The same objections present themselves when, as indicated in Figure 6, a nut may be considered as cylindrically tapped, see dotted lines, and a slotted crown portion of the nut moved radially inward which causes the nut threads to assume a straight taper with a coinciding straight taper pitch line, see full line threads.

Referring now to the present invention, Figure 7 shows a cylindrical thread and pitch line C in the body of the nut and the gradual and accelerated constriction of the threads along a curved pitch line P in the crown of the nut in such a manner that the inward displacement of the threads begins with zero at the region B and as the exposed end of the crown is approached the threads are gradually displaced inwardly and at an accelerated rate, this being clearly shown by the development of the curved pitch line.

The change in the pitch of the threads is so slow or gradual that localized zones of strain are avoided, and detrimental mis-matching of the threads of the nut and screw is eliminated.

When the constricted segments of the crown are moved outwardly under the influence of the screw, zones of localized strain are also avoided and pitch of the threads of the segments is brought into proper operative relation to the threads of the screw. The maximum deflection of the segments under the influence of the screw occurs when the screw nears the exposed ends of the segments where sufficient resiliency is present to prevent undue or localized strain or destruction of the threads. This feature of the present invention will be appreciated by a comparison of Figures 6 and 7. It will be observed that the distance between the cylindrical and tapered pitch line of Figure 6 and the cylindrical and curved pitch line of Figure 7 taken at the same point X is identical. The disposition of the threads under constriction, however, is radically different. In Figure 6 the inward constriction or distortion of the threads when considered in conjunction with the action of the threads of the screw is so rapid and so great as to produce the localized zone of strain hereinbefore referred to. In Figure 7, it will be observed that the distortion or inward constriction of the thread is much less than that of any corresponding part of the thread shown in Figure 6 and since the constriction follows the suggested curved pitch line, the localized zone of strain is avoided when the nut is advanced upon the screw.

A further comparison of Figures 6 and 7 will show that excessive frictional resistance between the threads of the nut and screw of the present invention is materially reduced. This serves to reduce damage to the threads of the nut or screw, and thereby prolongs the effective life of either or both parts.

Continued consideration will show that it is possible to obtain a closer symmetrical approach of the crest of the nut thread to the root of the screw thread than can be obtained in the straight taper of Figure 6, whether the same be occasioned by the use of a straight tapered tap or an inward constriction of the threads on a straight taper pitch line. It will be further observed in the comparison suggested, that at the same point in the comparable constructions the sides of the nut thread more closely approximate the sides of the screw thread in Figure 7 than in Figure 6. By the close approach of the sides of the nut thread of Figure 7 to the cooperating sides of the screw thread, factors entering into the disruption or disintegration of the threads of either or both members is materially reduced, if not eliminated.

For the purpose of distorting or bending the segments of the crown radially inward, I employ a former 15 in which is fashioned the shaping cavity 16. The side wall 17 of the cavity is curved as shown in Figure 5, so as to distort or bend inwardly the arcuate segments to the degree required as indicated by the curved pitch line. The angle of the outer surface of the arcuate segments and the distribution of the metal therein is such that when the former cavity contacts with the arcuate segments, as indicated by the dotted lines in Figure 5, continued downward movement of the former causes the arcuate segments to move inwardly to the full line position shown therein by virtue of the pressure exerted by the former. The distribution of the metal in the crown of the nut should be such that it will bend readily under the influence of the wall of the former cavity without creating any undue or excessive strain at a particular point or zone. It has been found that if the outer surface of the crown be provided with a taper between 10 and 20° the bending or distortion of the crown segments is facilitated and aids the bending of the segments to meet the desired curved pitch line without deleterious effect upon the nut structure.

Having thus described the invention, what is claimed is:

1. A nut having a body portion and a segmental crown portion, a plurality of threads formed in the body so as to define a straight pitch line, and a plurality of threads formed in the segmental crown portion at least some of which are constricted so as to define a curved pitch line.

2. A nut having a body portion and a segmental crown portion, a plurality of threads formed in the body so as to define a straight pitch line, and a plurality of threads formed in the segmental crown portion at least some of which are constricted so as to define a curved pitch line accelerated in degree toward the exposed end of the crown portion.

3. A nut comprising an internally threaded body portion and a crown portion formed integrally therewith and threaded in continuation of the threads in said body portion, the diameter of the threads in said crown portion being gradually and progressively decreased toward the exposed end of said crown portion on a curved line extending generally axially of the nut.

4. A self-locking nut comprising an internally threaded body portion and a constricted crown portion embodying an annular series of resilient arcuate segments threaded in continuation of the threads in the body portion, the diameter of the threads in said crown portion being gradually and progressively decreased toward the exposed end of said crown portion on a curved line extending generally axially of the nut.

5. A method of forming a self-locking nut which consists in fashioning a nut with a body portion and a plurality of segmental crown portions having tapered outer surfaces of the order of 10 to 20°, moving a former provided with a curved wall into contact initially with the exposed ends of the segmental portions and thereafter moving the former axially of the nut body thereby causing the segmental crown portions to move radially inward and maintain the development of a curved pitch line.

6. A method of forming a self-locking nut which consists in fashioning a nut with a body portion and a plurality of segmental crown portions having tapered outer surfaces of the order of 10 to 20°, moving a former provided with a curved wall into contact initially with the exposed ends of the segmental portions and thereafter moving the former axially of the nut body thereby causing the segmental crown portions to move radially inward and maintain the development of a curved pitch line accelerating in degree toward the exposed ends of the segmental crown portions.

7. A method of forming a self-locking nut which consists in fashioning a nut with a body portion and a plurality of segmental crown portions, cylindrically tapping the body and segmental crown portions, and distorting or constricting the segmental crown portions radially inward to an extent where the threads thereof maintain the development of a curved pitch line without inducing a localized zone of tension.

8. A method of forming a self-locking nut which consists in fashioning a nut with a body portion and a plurality of segmental crown portions having tapered outer surfaces of the order of 10 to 20°, distributing the metal in the segmental crown portions so as to avoid localized zones of tension when the crown portions are moved radially inward, moving a former provided with a curved wall into contact initially with the exposed ends of the segmental crown portions and thereafter moving the former axially of the nut body thereby causing the segmental crown portions to move radially inward and maintain the development of a curved pitch line.

9. A nut having a body portion and a segmental crown portion, a plurality of threads formed in the body so as to define a straight pitch line, and a plurality of threads formed in the segmental crown portion at least some of which are constricted so as to define a curved pitch line in every plane parallel with and passing through the axis of the threads.

10. A nut having a body portion and a segmental crown portion, a plurality of threads formed in the body so as to define a straight pitch line, and a plurality of threads formed in the segmental crown portion at least some of which are constricted so as to define a curved pitch line accelerated in degree toward the exposed end of the crown portion in every plane parallel with and passing through the axis of the threads.

11. A nut having a body portion and a plurality of spaced arcuate portions extending from the body portion and terminating in exposed ends, a plurality of threads formed in the body portion so as to define a straight pitch line and a plurality of threads formed in each arcuate portion between the body portion and the exposed ends constricted uniformly so as to define a curved pitch line.

12. A method of forming a self-locking nut which consists in fashioning a nut with a body portion and a plurality of segmental crown portions having tapered outer surfaces, moving a former provided with a curved wall into contact initially with the exposed ends of the segmental portions and thereafter moving the former axially of the nut body thereby causing the segmental crown portions to move radially inward and maintain the development of a curved pitch line.

CLARE L. BRACKETT.